(12) United States Patent
Hanya et al.

(10) Patent No.: US 8,363,361 B2
(45) Date of Patent: Jan. 29, 2013

(54) DISK DRIVE SUSPENSION HAVING A MICROACTUATOR MOUNTING SECTION PROVIDED WITH A MICROACTUATOR ELEMENT AND MANUFACTURING METHOD FOR THE DISK DRIVE SUSPENSION

(75) Inventors: Masao Hanya, Aiko-gun (JP); Tatsuhiro Kin, Aiko-gun (JP); Isamu Kuchiwaki, Aiko-gun (JP)

(73) Assignee: NHK Spring Co., Ltd., Yokohama-Shi (JP)

( * ) Notice: Subject to any disclaimer, the term of this patent is extended or adjusted under 35 U.S.C. 154(b) by 198 days.

(21) Appl. No.: 12/878,160

(22) Filed: Sep. 9, 2010

(65) Prior Publication Data

US 2011/0085269 A1 Apr. 14, 2011

(30) Foreign Application Priority Data

Oct. 9, 2009 (JP) ................................. 2009-235344

(51) Int. Cl.
*G11B 21/10* (2006.01)
*G11B 5/596* (2006.01)
(52) U.S. Cl. .................................. 360/294.4; 360/244.8
(58) Field of Classification Search ............... 360/294.3, 360/294.4, 244.5, 244.8, 264.5
See application file for complete search history.

(56) References Cited

U.S. PATENT DOCUMENTS

| | | | | |
|---|---|---|---|---|
| 5,764,444 A * | 6/1998 | Imamura et al. | ........... | 360/294.4 |
| 5,867,347 A * | 2/1999 | Knight et al. | ............. | 360/294.5 |
| 6,233,124 B1 * | 5/2001 | Budde et al. | ............... | 360/294.4 |
| 6,239,953 B1 * | 5/2001 | Mei | ............................ | 360/294.6 |
| 6,331,923 B1 * | 12/2001 | Mei | ............................ | 360/294.4 |
| 6,515,834 B1 * | 2/2003 | Murphy | ...................... | 360/294.4 |
| 6,624,982 B2 * | 9/2003 | Masuda et al. | ............. | 360/294.4 |
| 6,661,619 B2 * | 12/2003 | Nishida et al. | ............. | 360/294.4 |
| 6,731,472 B2 * | 5/2004 | Okamoto et al. | .......... | 360/294.3 |
| 6,791,783 B2 * | 9/2004 | Nakagawa | ....................... | 360/75 |
| 6,791,802 B2 * | 9/2004 | Watanabe et al. | .......... | 360/294.4 |
| 7,130,159 B2 * | 10/2006 | Shimizu et al. | ............ | 360/294.4 |
| 7,167,344 B2 * | 1/2007 | Nakagawa et al. | ........ | 360/294.4 |
| 7,292,413 B1 * | 11/2007 | Coon | ......................... | 360/294.4 |
| 8,174,797 B2 * | 5/2012 | Iriuchijima | ................ | 360/294.4 |
| 2010/0165516 A1 * | 7/2010 | Fuchino | ..................... | 360/294.4 |

FOREIGN PATENT DOCUMENTS

| | | |
|---|---|---|
| JP | 2001-307442 A | 11/2001 |
| JP | 2002-50140 A | 2/2002 |

* cited by examiner

*Primary Examiner* — Brian Miller

(74) *Attorney, Agent, or Firm* — Holtz, Holtz, Goodman & Chick, P.C.

(57) ABSTRACT

An element accommodation portion is formed in an electrically conductive plate member which constitutes a part of a suspension. A microactuator element comprising a piezoelectric element is located in the element accommodation portion. An electrically conductive resin member is disposed in a region covering junctions for electrically connecting the conductive plate member and the microactuator element. A pit is formed in the junction of the conductive plate member by partial-etching. A part of the conductive resin member is in the pit. A part of an outer peripheral edge of the conductive resin member is located inside an edge of the pit. The conductive resin member is covered by a cover layer.

16 Claims, 9 Drawing Sheets

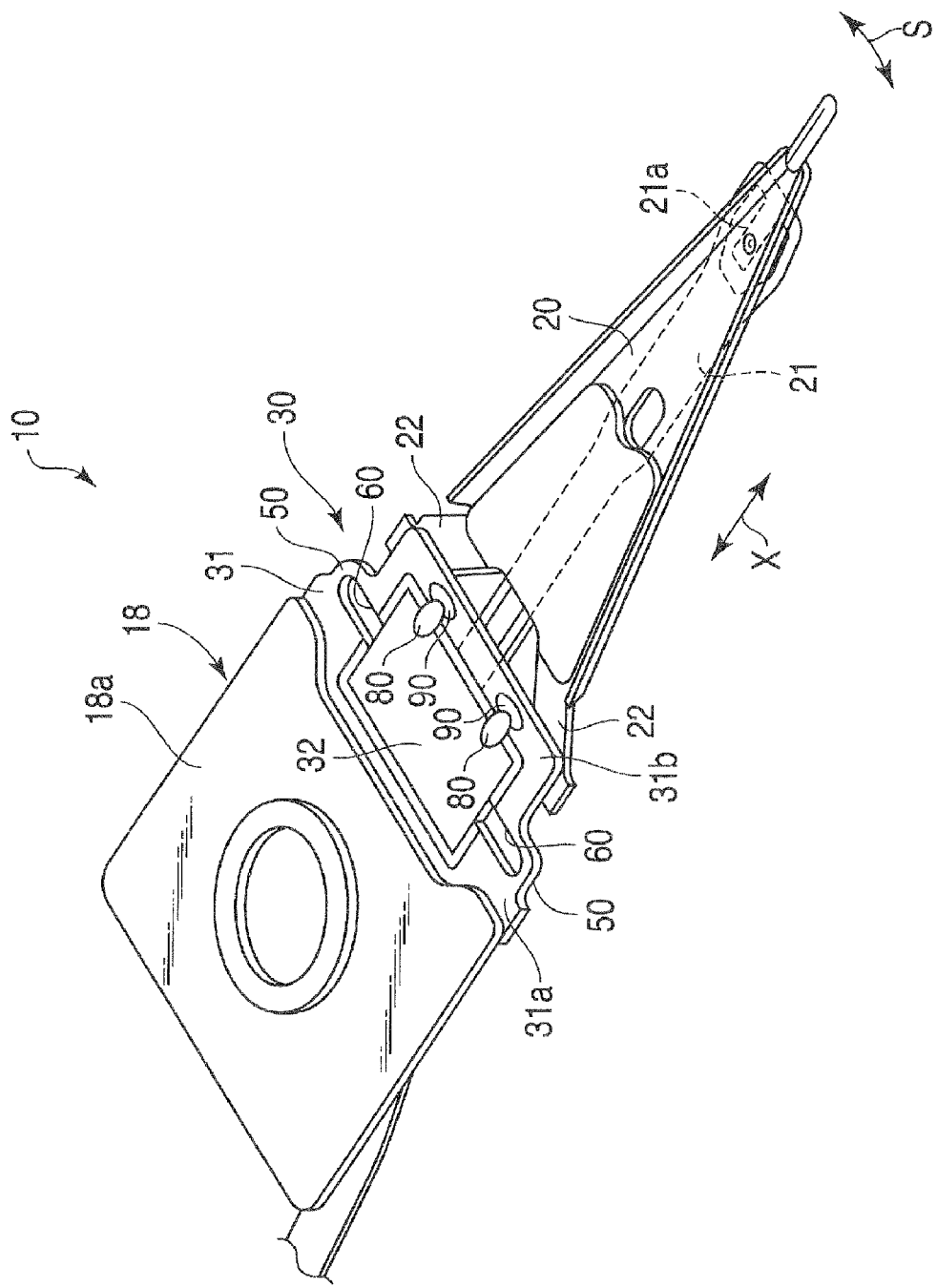
F I G. 3

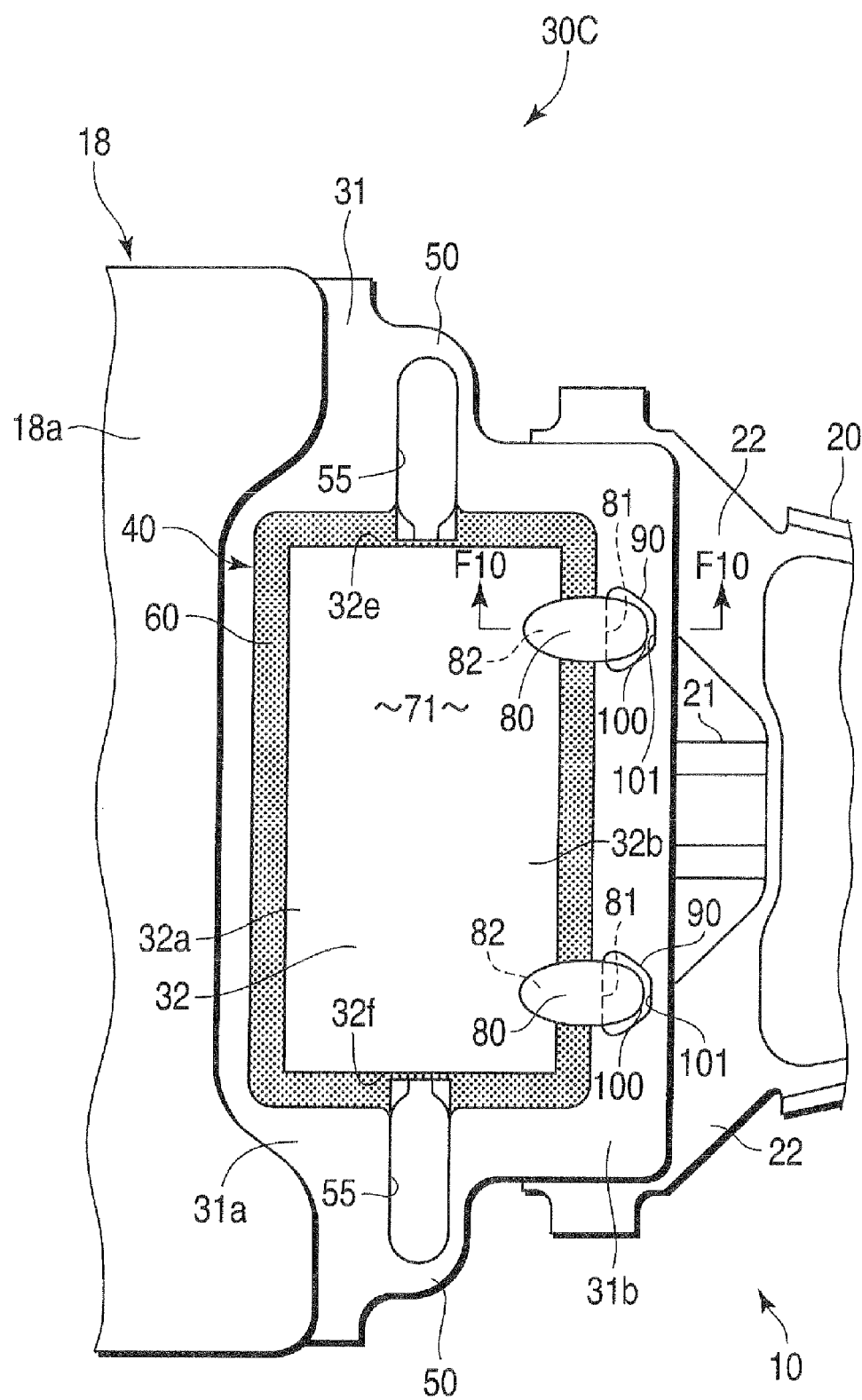
F I G. 9

DISK DRIVE SUSPENSION HAVING A MICROACTUATOR MOUNTING SECTION PROVIDED WITH A MICROACTUATOR ELEMENT AND MANUFACTURING METHOD FOR THE DISK DRIVE SUSPENSION

CROSS-REFERENCE TO RELATED APPLICATIONS

This application is based upon and claims the benefit of priority from prior Japanese Patent Application No. 2009-235344, filed Oct. 9, 2009, the entire contents of which are incorporated herein by reference.

BACKGROUND OF THE INVENTION

1. Field of the Invention

This invention relates to a suspension comprising a microactuator element used in a disk drive for an information processing apparatus, such as a personal computer, and a manufacturing method therefor.

2. Description of the Related Art

A hard disk drive (HDD) is used in an information processing apparatus, such as a personal computer. The HDD comprises a magnetic disk rotatable about a spindle, a carriage turnable about a pivot, etc. The carriage, which comprises an actuator arm, is turned transversely relative to tracks of the disk about the pivot by a positioning motor, such as a voice coil motor.

A suspension is mounted on the actuator arm. The suspension comprises a load beam and flexure superposed thereon. A slider, which constitutes a magnetic head, is mounted on a gimbal portion formed near the distal end of the flexure. The slider is provided with elements (transducers) for accessing data, that is, for reading or writing data.

In order to overcome the increase in the recording density of disks, the magnetic head needs to be more accurately positioned relative to the recording surface of each disk. To attain this, a dual-stage-actuator (DSA) suspension has been developed that combines a positioning motor (voice coil motor) and microactuator. Examples of the DSA suspension are disclosed in Jpn. Pat. Appln. KOKAI Publications Nos. 2001-307442 (Patent Document 1) and 2002-50140 (Patent Document 2).

The microactuator comprises a piezoelectric element of lead zirconate titanate (PZT) or the like. An element accommodation portion is formed in an electrically conductive plate member that constitutes a part of the suspension. The microactuator element is located in the element accommodation portion. The microactuator element serves to move the distal end of the suspension finely in a sway direction (or transversely relative to tracks) at high speed. An electrical junction is provided between the conductive plate member and microactuator element.

The piezoelectric element of the DSA suspension is platelike. A first electrode is disposed on one thicknesswise surface of the piezoelectric element, and a second electrode on the other surface. The first electrode is electrically connected to the conductive plate member as one conductive member through a conductive resin such as silver paste. The second electrode is connected to the other conductive member by a bonding wire or the like. The conductive resin comprises conductive filler particles, such as silver particles in a resin material. The conductive resin is cured after it is introduced to the junction.

Since the conductive resin is relatively viscous, air bubbles may sometimes be trapped in it as it is introduced to the conductive plate member. In addition, the air bubbles trapped in the conductive resin cannot be easily removed. In the conventional DSA suspension, the conductive resin is simply introduced to the junction of the conductive plate member. Therefore, the conductive resin, may fail to fully adhere to the conductive plate member, thereby causing conduction failure. In some cases, for example, a gap or hole may exist at the junction between the conductive resin and conductive plate member. In one such case, conduction failure was caused between the conductive plate member and microactuator element when a continuity test was conducted in a hot humid atmosphere.

BRIEF SUMMARY OF THE INVENTION

This invention provides a DSA suspension with a microactuator element, capable of ensuring conduction between an electrically conductive plate member and the microactuator element, and a manufacturing method therefor.

A disk drive suspension according to the present invention comprises a base section secured to an arm of a carriage, a load beam on which a slider of a magnetic head is located, and a microactuator mounting section between the base section and the load beam. The microactuator mounting section includes an electrically conductive plate member and a microactuator element. The conductive plate member includes a stationary part secured to the base section, a movable part secured to the load beam, and an element accommodation portion. The microactuator element is located in the element accommodation portion. An electrical junction is provided spanning the microactuator element and the conductive plate member. A pit is formed in the junction of the conductive plate member. An electrically conductive resin member for electrically connecting the microactuator element and the conductive plate member is disposed in a region covering the junction. A part of the conductive resin member is cured in the pit. The pit is formed by, for example, partial-etching.

In a preferred aspect of the invention, a part of an outer peripheral edge of the conductive resin member is located inside an edge of the pit. The thickness of an end portion of the conductive resin member in the pit is less than the depth of the pit. Further, the junction is provided with a cover layer which covers the conductive resin member, and an end of the cover layer may be defined by the edge of the pit.

The conductive resin member and the cover layer may be disposed on a partial undercoat layer of an electrically conductive resin after the undercoat layer is preliminarily applied to an inner surface of the pit. In this way, the incursion of air bubbles into the conductive resin member in the pit can be further reliably prevented.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general descrip

FIG. 3 is a perspective view of a suspension comprising a microactuator mounting section according to a first embodiment of the invention;

FIG. 9 is a plan view of a microactuator mounting section according to a fourth embodiment of the invention;

DETAILED DESCRIPTION OF THE INVENTION

A disk drive suspension according to a first embodiment of the present invention will now be described with reference to FIGS. 1 to 6.

Figure 1:
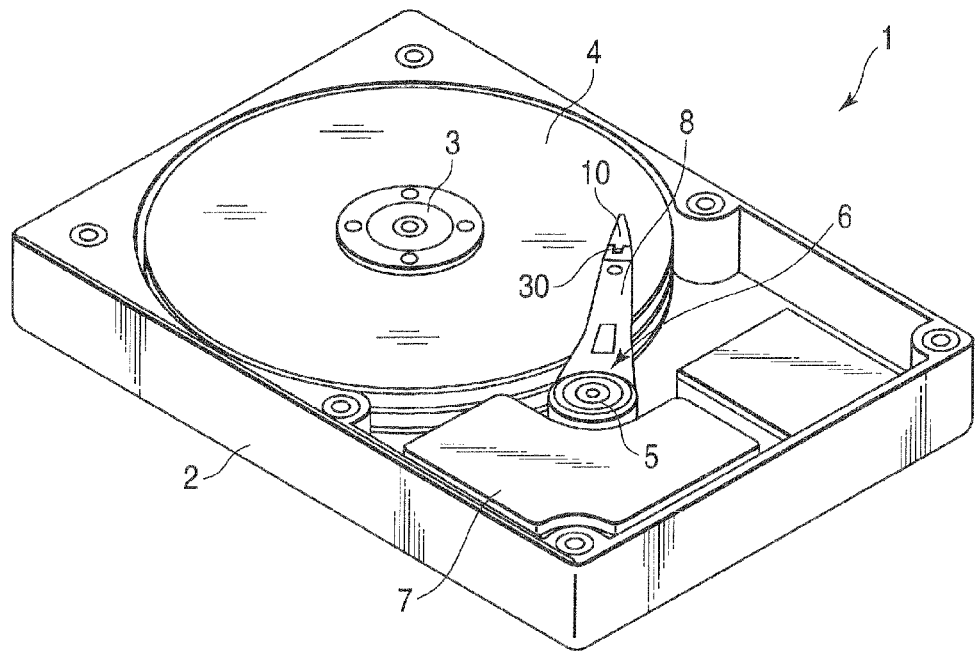
- FIG. 1 is a perspective view showing an example of a disk drive.

A disk drive (HDD) 1 shown in FIG. 1 comprises a case 2, disks 4 rotatable about a spindle 3, carriage 6 turnable about a pivot 5, positioning motor (voice coil motor) 7 for actuating the carriage 6, etc. The case 2 is covered by a lid (not shown).

Figure 2:
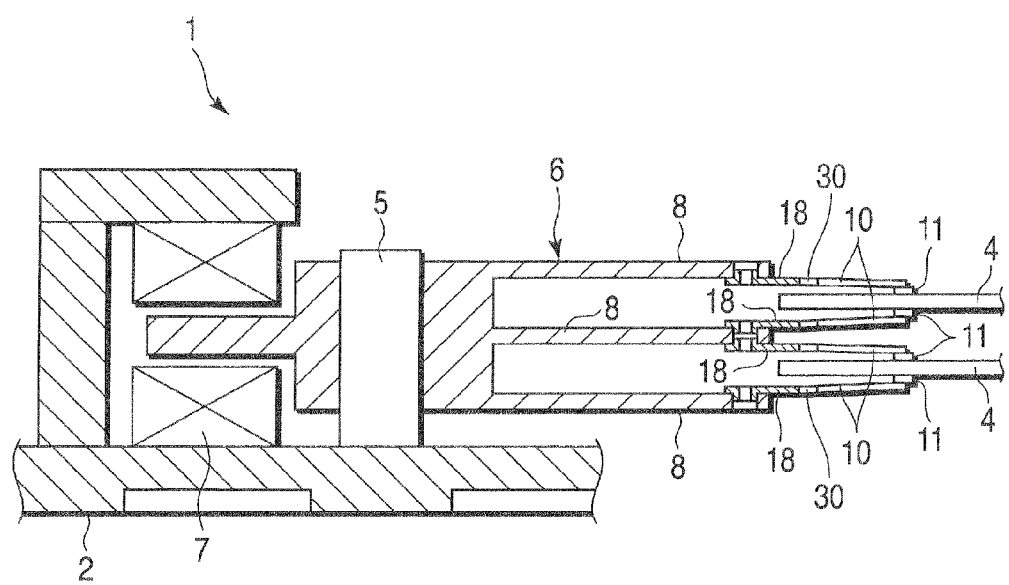
FIG. 2 is a sectional view of a part of the disk drive shown in FIG. 1.

FIG. 2 is a sectional view typically showing a part of the disk drive 1. As shown in FIG. 2, the carriage 6 comprises arms (carriage arms) 8. A suspension 10 is mounted on the distal end portion of each arm 8. A slider 11, which constitutes a magnetic head, is disposed on the distal end portion of the suspension 10. If each disk 4 is rotated at high speed, an air bearing is formed between the disk 4 and the slider 11.

If the carriage 6 is turned by the positioning motor 7, the suspension 10 moves radially relative to the disk 4. Thereupon, the slider 11 moves to a desired track of the disk 4. Elements, such as magnetoresistive elements (MR elements) capable of conversion between electrical and magnetic signals, are disposed on an end portion of the slider 11. These elements serve to write or read data to or from the disk 4.

FIG. 3 shows the (DSA) suspension 10 according to the first embodiment of the invention. This suspension 10 comprises a base section 18 including a baseplate 18a, load beam 20, flexure 21 with conductors, and microactuator mounting section 30. The microactuator mounting section 30 will be described in detail later.

Figure 4:
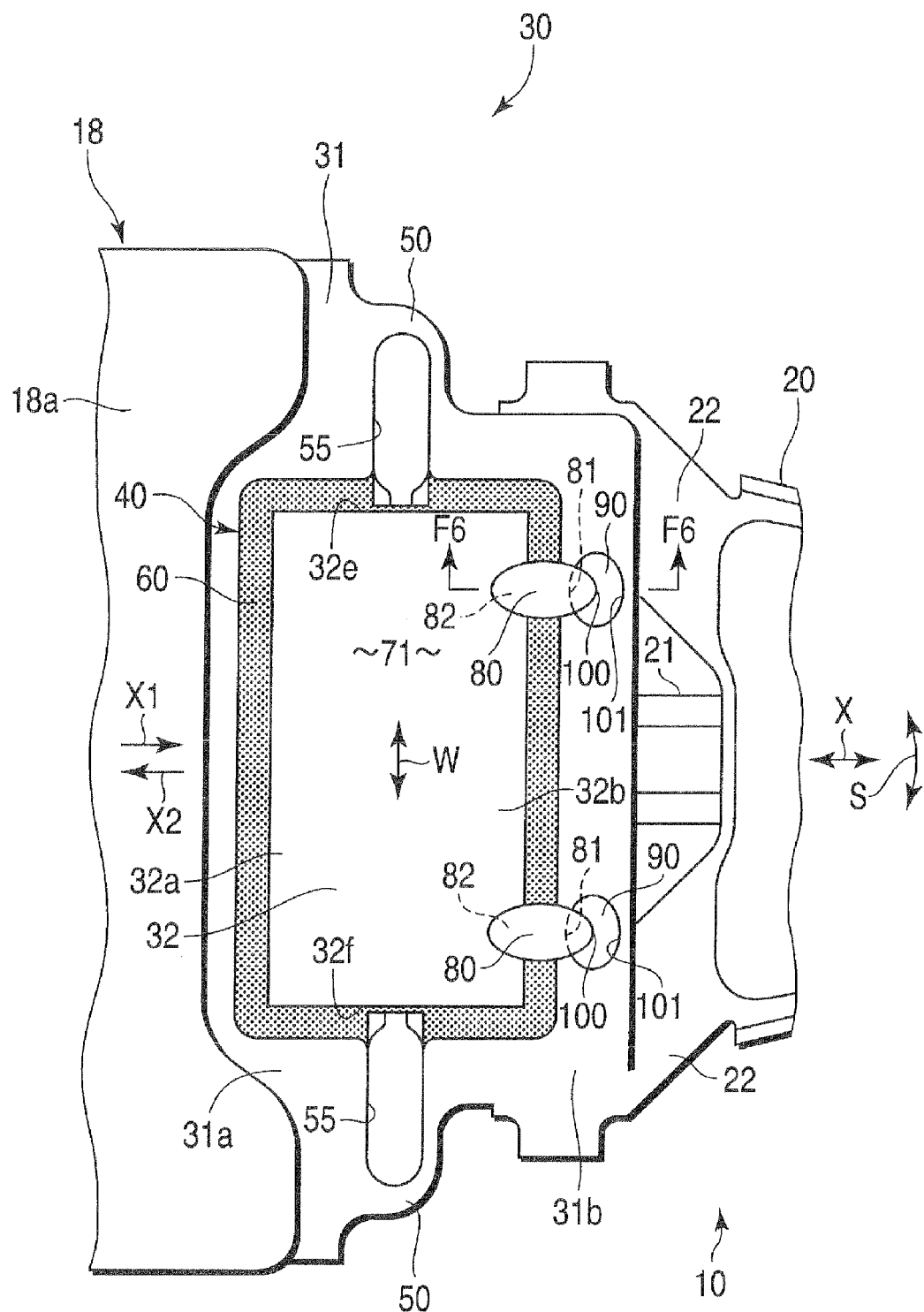
FIG. 4 is a plan view of the microactuator mounting section of the suspension shown in FIG. 3.

The load beam 20 is secured to its corresponding arm 8 (FIGS. 1 and 2) of the carriage 6 by the base section 18. Hinge portions 22 capable of thicknesswise elastic deformation are formed on the proximal portion (rear end portion) of the load beam 20. In FIGS. 3 and 4, arrow X indicates the longitudinal direction (front-rear direction) of the suspension 10 or that of the load beam 20, and arrow S indicates a sway direction.

The flexure 21 is located along the load beam 20. A part of the flexure 21 is secured to the load beam 20 by fixing means, such as laser welding. A tongue 21a (FIG. 3) that functions as a gimbal portion is formed near the distal end of the flexure 21. The slider 11 is mounted on the tongue 21a. The slider 11 of the magnetic head is located on the distal end portion of the load beam 20. The suspension 10 and slider 11 constitute a head gimbal assembly.

FIG. 4 is an enlarged view of the microactuator mounting section 30. The microactuator mounting section 30 is located between the base section 18 and load beam 20. The mounting section 30 comprises an electrically conductive plate member 31, which constitutes a part of the suspension 10, and a microactuator element 32 comprising a piezoelectric element, such as PZT.

The conductive plate member 31 consists of austenite stainless steel, such as SUS304. The chemical composition of SUS304 comprises 0.08 or less carbon, 1.00 or less silicon, 2.00 or less manganese, 8.00 to 10.50 nickel, 18.00 to 20.00 chromium, and iron for the remainder.

In the present embodiment, the conductive plate member 31 is formed independently of the baseplate 18a. Specifically, the base section 18 is formed by superposing the baseplate 18a and conductive plate member 31 thicknesswise. Alternatively, however, the plate member 31 may be formed by thinning a part of the baseplate 18a by press-forming or partial etching.

The conductive plate member 31 comprises a stationary part 31a and movable part 31b. The stationary part 31a is secured to the baseplate 18a. The movable part 31b is secured to the hinge portions 22 at the proximal portion (rear end portion) of the load beam 20. The direction indicated by arrow X1 in FIG. 4 is assumed to be forward relative to the plate member 31 with respect to the front-rear (longitudinal) direction of the suspension 10, and the direction indicated by arrow X2 to be rearward. Arrow W indicates the transverse direction of the conductive plate member 31 and microactuator element 32.

Figure 5:
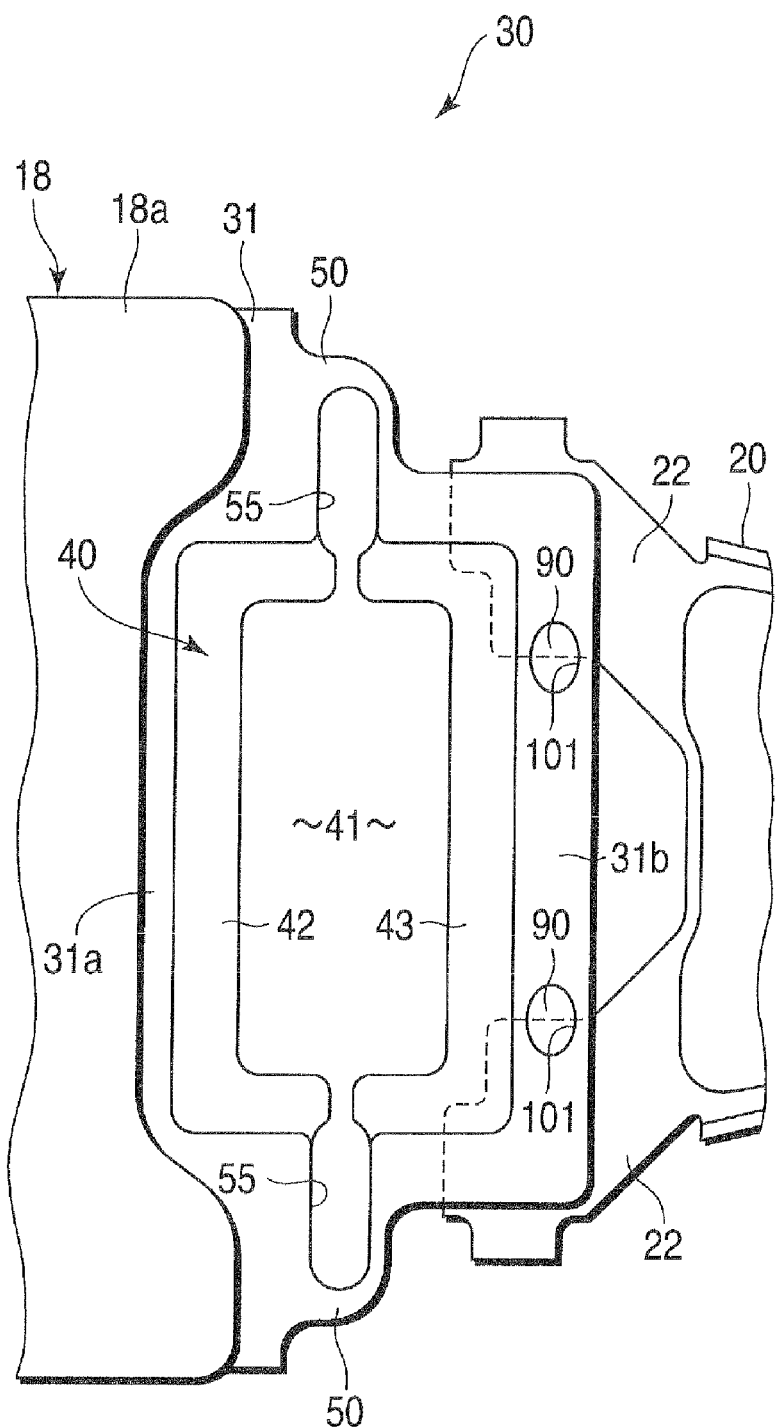
FIG. 5 is a plan view of the microactuator mounting section of FIG. 4 cleared of a microactuator element.

FIG. 5 shows the microactuator mounting section 30 cleared of the microactuator element 32. The conductive plate member 31 is formed with an element accommodation portion 40, which is a recess sufficiently large to accommodate the element 32. The element accommodation portion 40 is defined between the stationary and movable parts 31a and 31b.

The element accommodation portion 40 is formed with an opening 41 smaller than the microactuator element 32. Step portions 42 and 43 are formed around the opening 41. The step portions 42 and 43 are formed by thinning the conductive plate member 31 by press-forming or partial etching. The microactuator element 32 can be placed on the step portions 42 and 43.

Arm portions 50 are formed individually on the opposite side portions of the conductive plate member 31. Slits 55 are defined inside the arm portions 50, individually. As shown in FIG. 5, the slits 55 communicate with the opening 41 of the element accommodation portion 40. Each arm portion 50 is a part of the conductive plate member 31. The transverse rigidity of the arm portions 50 is less than the thicknesswise rigidity thereof. Therefore, the arm portions 50 can be deformed transversely relative to the conductive plate member 31.

The movable part 31b can move relative to the stationary part 31a over a certain stroke in the sway direction (indicated by arrow S in FIGS. 3 and 4) by means of the arm portions 50. Thus, the stationary and movable parts 31a and 31b of the conductive plate member 31 are connected to each other for displacement by the pair of arm portions 50.

The microactuator element 32 is shown as rectangular in the plan view of FIG. 4. An adhesive 60 is deposited between the outer periphery of the microactuator element 32 and the inner periphery of the element accommodation portion 40. The adhesive 60 consists of an electrically insulating high polymer material (e.g., ultraviolet-curable resin). The adhesive 60 is cured after it is introduced in a liquid state between the conductive plate member 31 and microactuator element 32. The adhesive 60 may contain electrically insulating solid particles (filler particles).

One end portion 32a (nearer to the base section 18) of the microactuator element 32 is supported by the step portion 42 (FIG. 5). The end portion 32a is secured to the stationary part 31a of the conductive plate member 31 by the adhesive 60. The other end portion 32b (nearer to the load beam 20) of the microactuator element 32 is supported by the other step portion 43 (FIG. 5). The end portion 32b is secured to the movable part 31b of the conductive plate member 31 by the adhesive 60. Opposite side surfaces 32e and 32f of the microactuator element 32 are secured to the stationary and movable parts 31a and 31b, respectively, by the adhesive 60. A distortion of the microactuator element 32 caused when an electrical potential is applied thereto is transmitted to the load beam 20 through the movable part 31b.

The microactuator element 32 is plate-like. A first electrode 71 is provided on one thicknesswise surface (upper surface in FIG. 6) of the microactuator, element 32, and a second electrode 72 on the other surface (lower surface in FIG. 6). The electrodes 71 and 72 are, for example, gold layers formed individually on the opposite surfaces of the microactuator element 32 by sputtering or plating.

The first electrode 71 is electrically connected to the conductive plate member 31 through conductive resin members 80. Each conductive resin member 80 is disposed in a region that covers a junction 81 of the conductive plate member 31 and a junction 82 of the microactuator element 32. Silver paste is an example of the conductive resin member 80. The silver paste contains a resin material 80a and a large number of conductive filler particles 80b mixed therein. The filler particles 80b may be silver particles, for example. The uncured conductive resin member 80 is introduced to the region that covers the junctions 81 and 82 for energization. As the resin material 80a is cured, the conductive resin member 80 is secured to the junctions 81 and 82.

The electrical resistance of the conductive resin member 80 may vary depending on the state of mixture of the conductive filler particles 80b. To overcome this, dielectric breakdown is caused between the filler particles 80b by applying a potential (e.g., 12 V) higher than a threshold potential to the conductive resin member 80. The electrical resistance of the conductive resin member 80 can be stabilized in this manner.

Each junction 81 of the conductive plate member 31 is formed with a recess or pit 90. As shown in FIGS. 4 and 5, the shape of the pit 90 as viewed from above the conductive plate member 31 is, for example, elliptical or oval. However, the pit shape is not limited to this and may alternatively be circular, trapezoidal, or quadrangular. The pit 90 is formed by partial-etching. Thus, an inner surface 90a of the pit 90 is chemically polished with an etchant so that the conductive resin member 80 can easily adhere to it.

Figure 6:
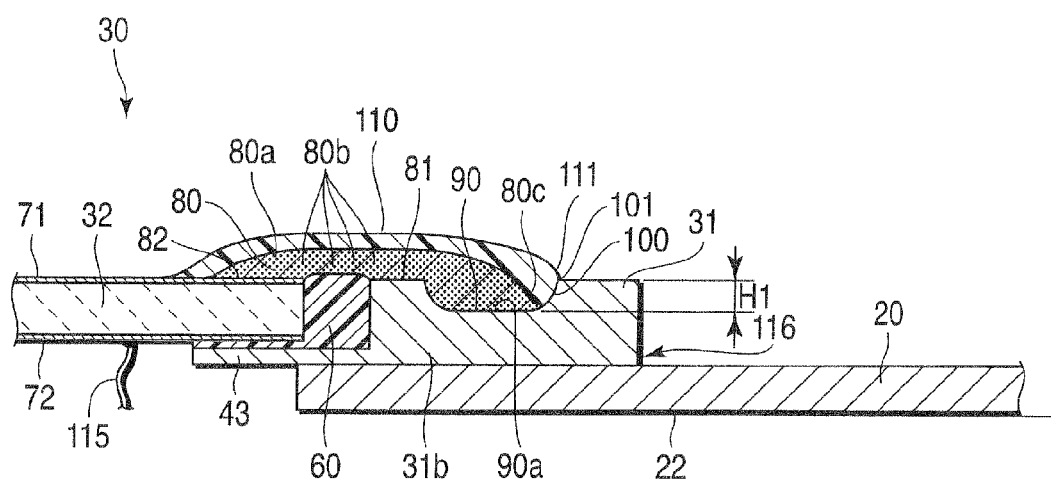
FIG. 6 is a sectional view of the microactuator mounting section taken along line F6-F6 of FIG. 4.

As shown in FIGS. 4 and 6, a part of an outer peripheral edge 100 of each conductive resin member 80 is located inside an edge of each corresponding pit 90. The conductive resin member 80 is introduced so that the thickness of its end portion 80c in the pit 90 is less than the depth H1 (FIG. 6) of the pit 90.

Each conductive resin member 80 is covered by a cover layer 110 (FIG. 6). The cover layer 110 consists of, for example, a photosetting resin (high polymer material). The cover layer 110 entirely covers the conductive resin member 80 to protect it. The cover layer 110 is coated in an uncured liquid state on the conductive resin member 80. An end 111 of the cover layer 110 is barred by a front edge 101 of the pit 90 so as not to project outside the edge 101.

As shown in FIG. 6, the second electrode 72 of the microactuator element 32 is connected to the other conductive member (not shown) by a bonding wire 115. An example of the other conductive member is a conductor attached to the flexure 21 with conductors. Alternatively, however, a conductor other than the flexure 21 may be used as the other conductive member.

The following is a description of a manufacturing method for the suspension 10 with the microactuator mounting section 30 constructed in this manner.

The pit 90 is formed in the junction 81 of the conductive plate member 31 by partial-etching. Further, the microactuator element 32 is introduced into the element accommodation portion 40 of the conductive plate member 31. Thereafter, the adhesive 60 is introduced between the microactuator element 32 and accommodation portion 40 and then cured.

Each uncured conductive resin member 80 is introduced to the region that covers the junctions 81 and 82. As shown in FIG. 6, a part of the conductive resin member 80 is also introduced into the pit 90. The outer peripheral edge 100 of the conductive resin member 80 is stopped inside the front edge 101 of the pit 90. Thus, the outer peripheral edge 100 of the conductive resin member 80 is located inside the edge 101 of the pit 90. In this way, the incursion of air bubbles into the conductive resin member 80 in the pit 90 can be prevented. Consequently, conduction between the conductive plate member 31 and conductive resin member 80 can be reliably achieved. Further, the thickness of the end portion 80c of the conductive resin member 80 in the pit 90 that is less than the depth H1 (FIG. 6) of the pit 90 also helps prevent the trapping of air bubbles.

If necessary, a potential (voltage) higher than the threshold potential may be applied to the conductive resin member 80, thereby causing dielectric breakdown in the filler particles 80b in the conductive resin member 80. In this way, the conduction of the conductive resin member 80 can be made more reliable, and the electrical resistance can be stabilized. Then, the conductive resin member 80 is cured.

Further, a liquid resin for the cover layer 110 is coated and cured on the conductive resin member 80. As shown in FIG. 6, the position of the end 111 of the cover layer 110 is defined by the outer peripheral edge 100 of the pit 90. Thus, a part of the cover layer 110 can be prevented from projecting outside the pit 90. Consequently, the cover layer 110 can be prevented from partially adhering to and detrimentally affecting certain regions or contaminating laser welds or the like.

The edge 101 can prevent the cover layer 110 from projecting outside the pit 90. Therefore, partial incursion of the cover layer 110 into a boundary portion 116 (FIG. 6) between its corresponding hinge portion 22 and the conductive plate member 31, and there being cured, can be prevented. If a part of the cover layer 110 is cured in the boundary portion 116, the flexibility of the hinge portion 22 changes at the boundary portion 116. In this case, the flexibility of the hinge portion 22 is inevitably degraded. According to the present embodiment, however, the cover layer 110 can be prevented from partially flowing into and being cured in the boundary portion 116, so that the spring characteristics of the hinge portion 22 can be maintained.

As described above, the manufacturing method for the disk drive suspension 10 of the present embodiment comprises the steps of:

(1) forming each pit 90 in a part of the conductive plate member 31 by partial-etching and chemically polishing the inner surface 90a of the pit 90 by partial-etching;

(2) locating the microactuator element 32 in the element accommodation portion 40;

(3) securing the microactuator element 32 to the conductive plate member 31 with the adhesive 60;

(4) introducing the uncured conductive resin member 80 to the junctions 81 and 82 and disposing a part of the conductive resin member 80 in the pit 90;

(5) curing the conductive resin member 80;

(6) passing an electrical current through the conductive resin member 80, thereby causing dielectric breakdown and stabilizing the electrical resistance (this step can be omitted if the conduction of the conductive resin member 80 can be fully secured without performing it);

(7) coating an uncured resin on the conductive resin member 80 to form the cover layer 110 and defining the end 111 of the cover layer 110 by means of the edge 101 of the pit 90 so that the cover layer 110 does not projects outside the pit 90; and (8) curing the cover layer 110.

The microactuator mounting section 30 with the microactuator element 32 is formed in Steps 1 to 8, described above.

The following is a description of the operation of the suspension 10.

If the carriage 6 is turned by the positioning motor 7, the suspension 10 moves radially relative to the disk 4. Thereupon, the slider 11 of the magnetic head moves to a desired track of the disk 4.

The first electrode 71 of the microactuator element 32 is connected to a first terminal of a drive circuit through the conductive resin member 80 and conductive plate member 31. The second electrode 72 is connected to a second terminal of the drive circuit by the bonding wire 115. A potential produced by the drive circuit is applied to the microactuator element 32 through the electrodes 71 and 72.

On application of the potential (voltage), the microactuator element 32 is distorted according to the magnitude of the potential. Therefore, the distal end of the load beam 20 can be finely moved in the sway direction (indicated by arrow S in FIGS. 3 and 4). Thus, the slider 11 can be positioned quickly and accurately in the sway direction.

Figure 7:
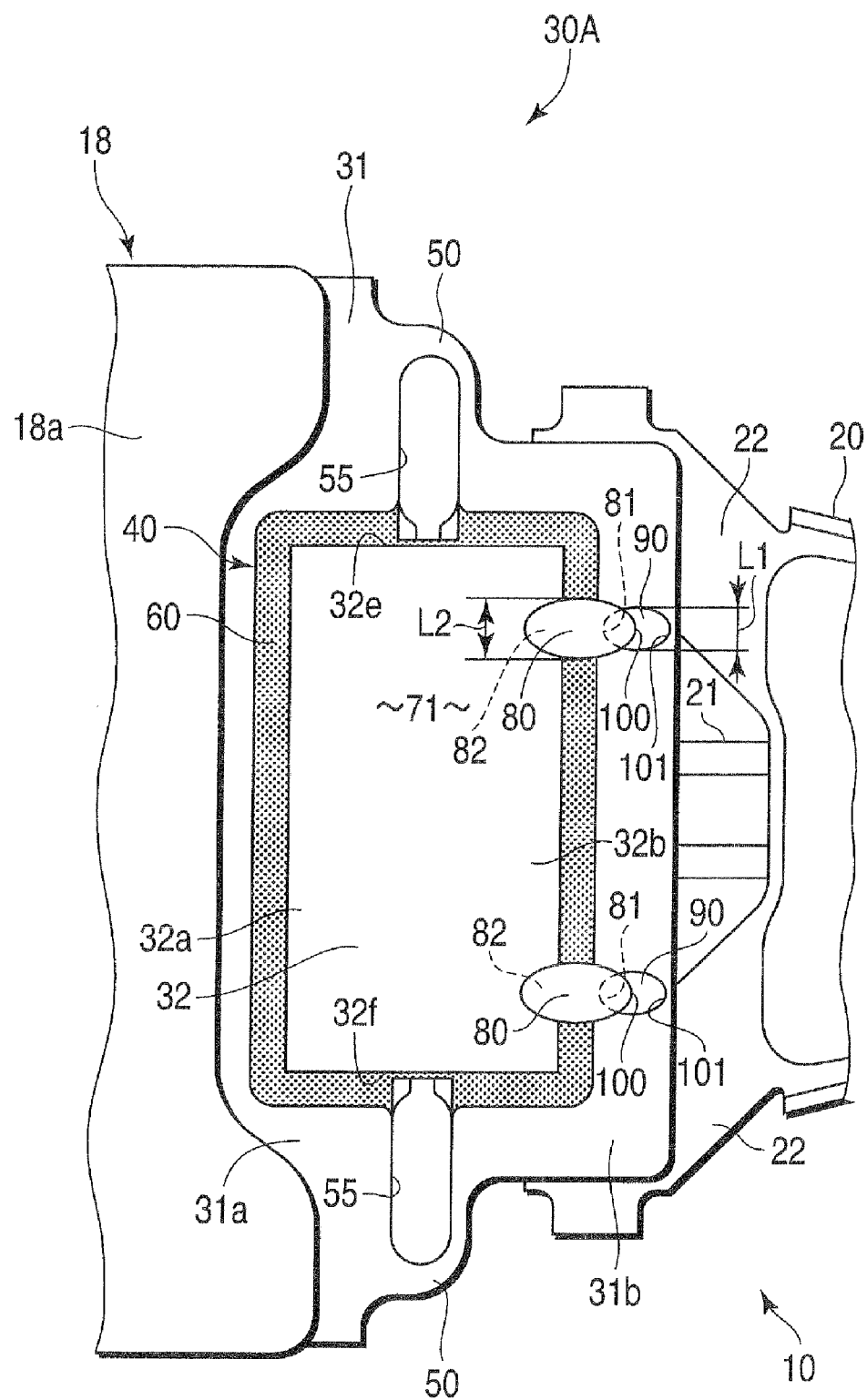
FIG. 7 is a plan view of a microactuator mounting section according to a second embodiment of the invention.

FIG. 7 shows a microactuator mounting section 30A according to a second embodiment of the invention. Also in this embodiment, pits 90 are formed by partial-etching. Width L1 of each pit 90 is less than width L2 of a conductive resin member 80. Since other configurations and effects are common to the first and second embodiments, common numbers are used to designate common portions, and a description of those portions is omitted.

Figure 8:
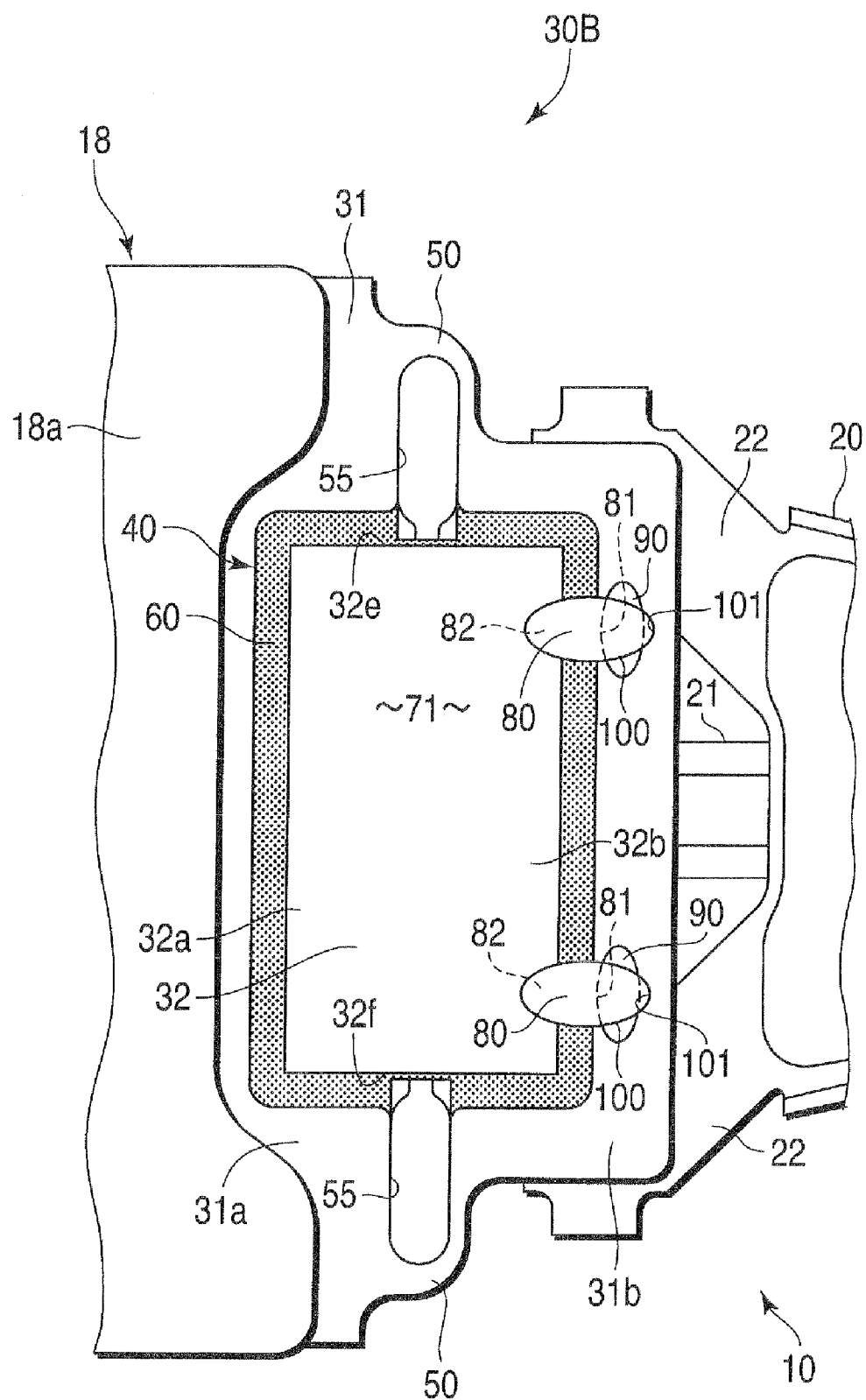
FIG. 8 is a plan view of a microactuator mounting section according to a third embodiment of the invention.

FIG. 8 shows a microactuator mounting section 30B according to a third embodiment of the invention. Also in this embodiment, pits 90 are formed by partial-etching. A part of an outer peripheral edge 100 of a conductive resin member 80 is located inside the transversely opposite ends of each pit 90. Since other configurations and effects are common to the first and third embodiments, common numbers are used to designate common portions, and a description of those portions is omitted.

Figure 10:
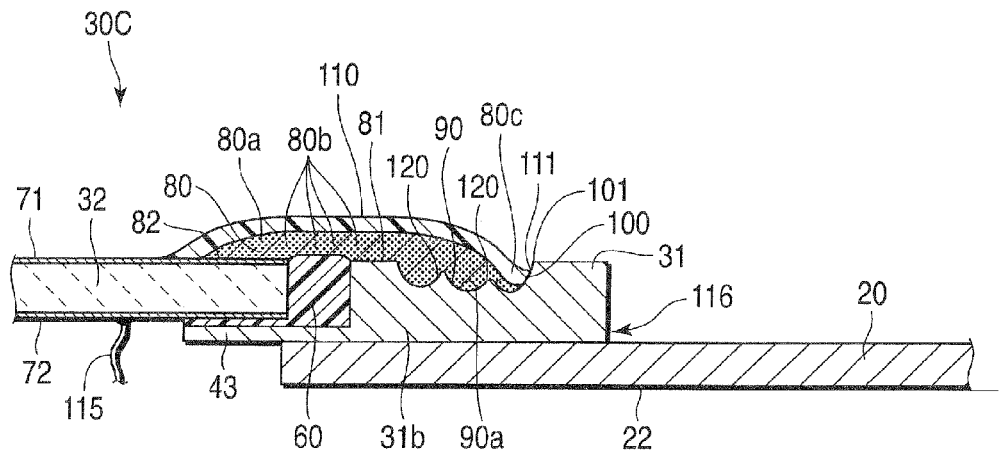
FIG. 10 is a sectional view of the microactuator mounting section taken along line F10-F10 of FIG. 9.

FIGS. 9 and 10 show a microactuator mounting section 30C according to a fourth embodiment of the invention. Each of pits 90 of this embodiment is substantially trapezoidal as viewed from above a conductive plate member 31. As shown in FIG. 10, a plurality of protuberances 120 are formed on an inner surface 90a of each pit 90 formed by partial-etching. The inner surface 90a of the pit 90 is chemically polished with an etchant so that a conductive resin member 80 can easily adhere to it. Thus, the strength of adherence of the conductive resin member 80 to the inner surface 90a of the pit 90 can be increased. Since other configurations and effects are common to the first and fourth embodiments, common numbers are used to designate common portions, and a description of those portions is omitted.

Figure 11:
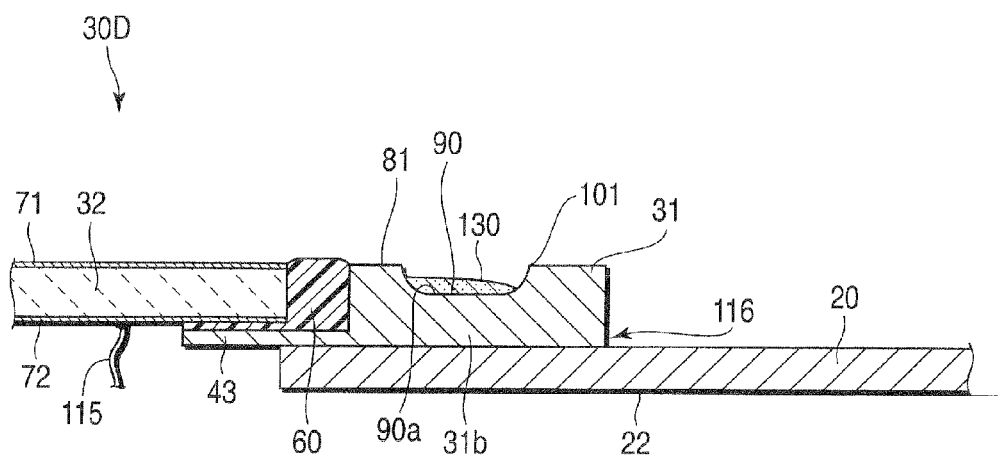
FIG. 11 is a sectional view showing a part of a microactuator mounting section and an undercoat layer according to a fifth embodiment of the invention.
Figure 12:
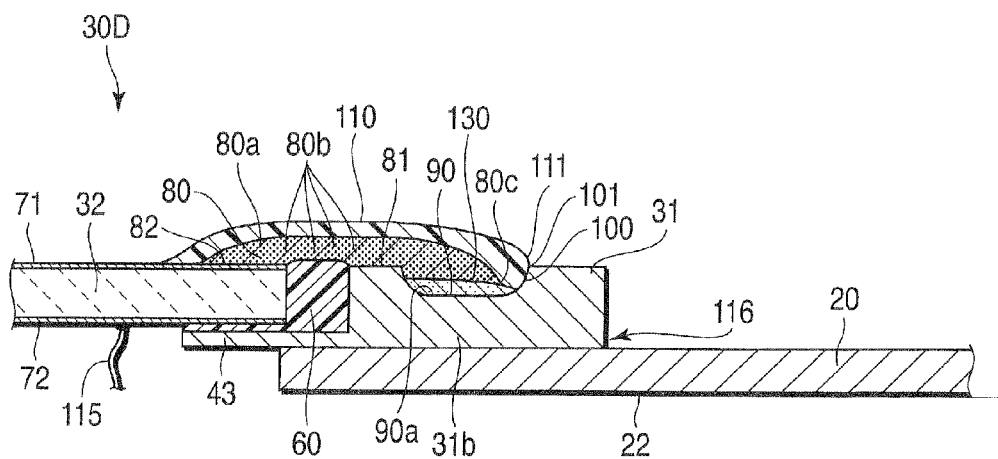
FIG. 12 is a sectional view showing a state in which the microactuator mounting section shown in FIG. 11 is provided with a conductive resin member and cover layer.

FIGS. 11 and 12 show a microactuator mounting section 30D according to a fifth embodiment of the invention. In this embodiment, as shown in FIG. 11, a partial undercoat layer 130 is preliminarily applied to an inner surface 90a of each pit 90. An example of the undercoat layer 130 comprises a resin material 80a identical with the conductive resin member 80 and conductive filler particles 80b. Alternatively, however, the undercoat layer 130 may consist of a conductive material different from the conductive resin member 80. After the undercoat layer 130 is provided, the conductive resin member 80 and a cover layer 110 are fed onto the undercoat layer 130, as shown in FIG. 12. The conductive resin member 80 is thinner than the undercoat layer 130. By this undercoating step, the incursion of air bubbles into the conductive resin member 80 in the pit 90 can be further reliably prevented. Since other configurations are common to the first and fifth embodiments, common numbers are used to designate common portions, and a description of those portions is omitted.

In the disk drive suspension with a microactuator element according to each of the embodiments described herein, the conductive resin members can be reliably stuck to the junctions of the conductive plate member, so that conduction failure can be prevented. Thus, conduction between the conductive plate member and microactuator element can be reliably achieved.

The trapping of air bubbles in the conductive resin members in the pits can be suppressed by locating a part of the outer peripheral edge of each conductive resin member inside the edge of each pit. Alternatively, the trapping of air bubbles in the conductive resin members in the pits may be suppressed by making the thickness of the end portion of the conductive resin member in each pit less than the depth of the pit. If the cover layer is provided on the surface of each conductive resin member, moreover, the end of the cover layer can be defined by the edge of the pit, so that the cover layer can be prevented from projecting outside the pit.

It is to be understood, in carrying out the present invention, that the shapes and materials of the conductive plate member and microactuator element of the microactuator mounting section and the shapes, layouts, etc., of the pits, as well as the base section and load beam, which constitute each suspension, may be embodied in various forms. For example, a pair of microactuator elements may be arranged parallel to each other transversely relative to the conductive plate member.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A disk drive suspension comprising:
    a base section secured to an arm of a carriage of a disk drive;
    a load beam on which a slider of a magnetic head is located; and
    a microactuator mounting section provided between the base section and the load beam, the microactuator mounting section comprising:
        an electrically conductive plate member comprising a stationary part secured to the base section, a movable part secured to the load beam, and an element accommodation portion; and
        a microactuator element provided in the element accommodation portion;
    wherein:
        the conductive plate member is formed with a pit in a junction thereof for electrically connecting the microactuator element and the conductive plate member,
        an electrically conductive resin member for electrically connecting the microactuator element and the conductive plate member is disposed in a region covering the junction, and
        a part of the conductive resin member is cured in the pit.

2. The disk drive suspension according to claim 1, wherein a part of an outer peripheral edge of the conductive resin member is located inside an edge of the pit.

3. The disk drive suspension according to claim 2, wherein the junction is provided with a cover layer which covers the conductive resin member, an end of the cover layer being defined by the edge of the pit.

4. The disk drive suspension according to claim 3, wherein an undercoat layer of an electrically conductive resin is disposed on an inner surface of the pit, and the conductive resin member is disposed on the undercoat layer.

5. The disk drive suspension according to claim 2, wherein an undercoat layer of an electrically conductive resin is disposed on an inner surface of the pit, and the conductive resin member is disposed on the undercoat layer.

6. The disk drive suspension according to claim 1, wherein a thickness of an end portion of the conductive resin member in the pit is less than a depth of the pit.

7. The disk drive suspension according to claim 6, wherein the junction is provided with a cover layer which covers the conductive resin member, an end of the cover layer being defined by an edge of the pit.

8. The disk drive suspension according to claim 7, wherein an undercoat layer of an electrically conductive resin is disposed on an inner surface of the pit, and the conductive resin member is disposed on the undercoat layer.

9. The disk drive suspension according to claim 6, wherein an undercoat layer of an electrically conductive resin is disposed on an inner surface of the pit, and the conductive resin member is disposed on the undercoat layer.

10. The disk drive suspension according to claim 1, wherein the junction is provided with a cover layer which covers the conductive resin member, an end of the cover layer being defined by an edge of the pit.

11. The disk drive suspension according to claim 10, wherein an undercoat layer of an electrically conductive resin is disposed on an inner surface of the pit, and the conductive resin member is disposed on the undercoat layer.

12. The disk drive suspension according to claim 1, wherein an undercoat layer of an electrically conductive resin is disposed on an inner surface of the pit, and the conductive resin member is disposed on the undercoat layer.

13. A method for manufacturing the disk drive suspension according to claim 1, the method comprising:
    forming the pit in the junction of the conductive plate member by partial-etching;
    locating the microactuator element in the element accommodation portion;
    securing the microactuator element to the conductive plate member with an adhesive;
    introducing an uncured conductive resin member to a region including the junction and causing incursion of a part of the uncured conductive resin member into the pit;
    curing the conductive resin member;
    coating an uncured resin on the cured conductive resin member, thereby forming a cover layer;
    defining an end of the cover layer by an edge of the pit; and
    curing the cover layer.

14. The method according to claim 13, wherein an inner surface of the pit is chemically polished by partial-etching.

15. The method according to claim 14, wherein the uncured conductive resin member is fed onto an undercoat layer of an electrically conductive resin after the undercoat layer is applied to an inner surface of the pit.

16. The method according to claim 13, wherein the uncured conductive resin member is fed onto an undercoat layer of an electrically conductive resin after the undercoat layer is applied to an inner surface of the pit.

* * * * *